United States Patent [19]

Cipollini et al.

[11] Patent Number: 5,478,663
[45] Date of Patent: Dec. 26, 1995

[54] EDGE SEALS FOR MOLTEN CARBONATE FUEL CELL STACKS

[75] Inventors: Ned E. Cipollini, Enfield, Conn.; Lawrence J. Bregoli, Southwick, Mass.; Donald L. Maricle, Glastonbury, Conn.

[73] Assignee: International Fuel Cells Corporation, South Windsor, Conn.

[21] Appl. No.: 216,198

[22] Filed: Mar. 22, 1994

[51] Int. Cl.[6] .................................. H01M 8/02
[52] U.S. Cl. .................... 429/35; 427/115; 501/127
[58] Field of Search ............... 429/35, 184; 501/127, 501/52; 427/115

[56] References Cited

U.S. PATENT DOCUMENTS

| | | | |
|---|---|---|---|
| 4,049,872 | 9/1977 | Hang | 501/52 X |
| 4,514,475 | 4/1985 | Mientek | 429/35 |
| 4,548,874 | 10/1985 | Katz et al. | 429/18 |
| 4,659,635 | 4/1987 | Reiser et al. | 429/41 |
| 4,761,348 | 8/1988 | Kunz et al. | 429/35 |
| 4,794,055 | 12/1988 | Matsumura et al. | 429/35 |

FOREIGN PATENT DOCUMENTS 1-206568  8/1989  Japan ..................... H01M 8/20

Primary Examiner—Stephen Kalafut

[57] ABSTRACT

The reactant manifolds and corners of a molten carbonate fuel cell stack are sealed with particulate lithium aluminate members which are sufficiently porous so as to resist significant electrolyte migration therethrough. The seal members which are disposed in vertical planes of the stack are preferentially formed from lithium aluminate grains which are bonded together by a silica-free glass binder. The seal members which are disposed in horizontal planes in the stack are preferably formed from lithium aluminate grains which are bonded together by surface hydrolysis. Alumina-clad stainless steel labyrinth seal members are associated with each of the horizontal seal members to inhibit electrolyte migration from the cell electrolyte matrices to the vertical seal members.

19 Claims, 1 Drawing Sheet

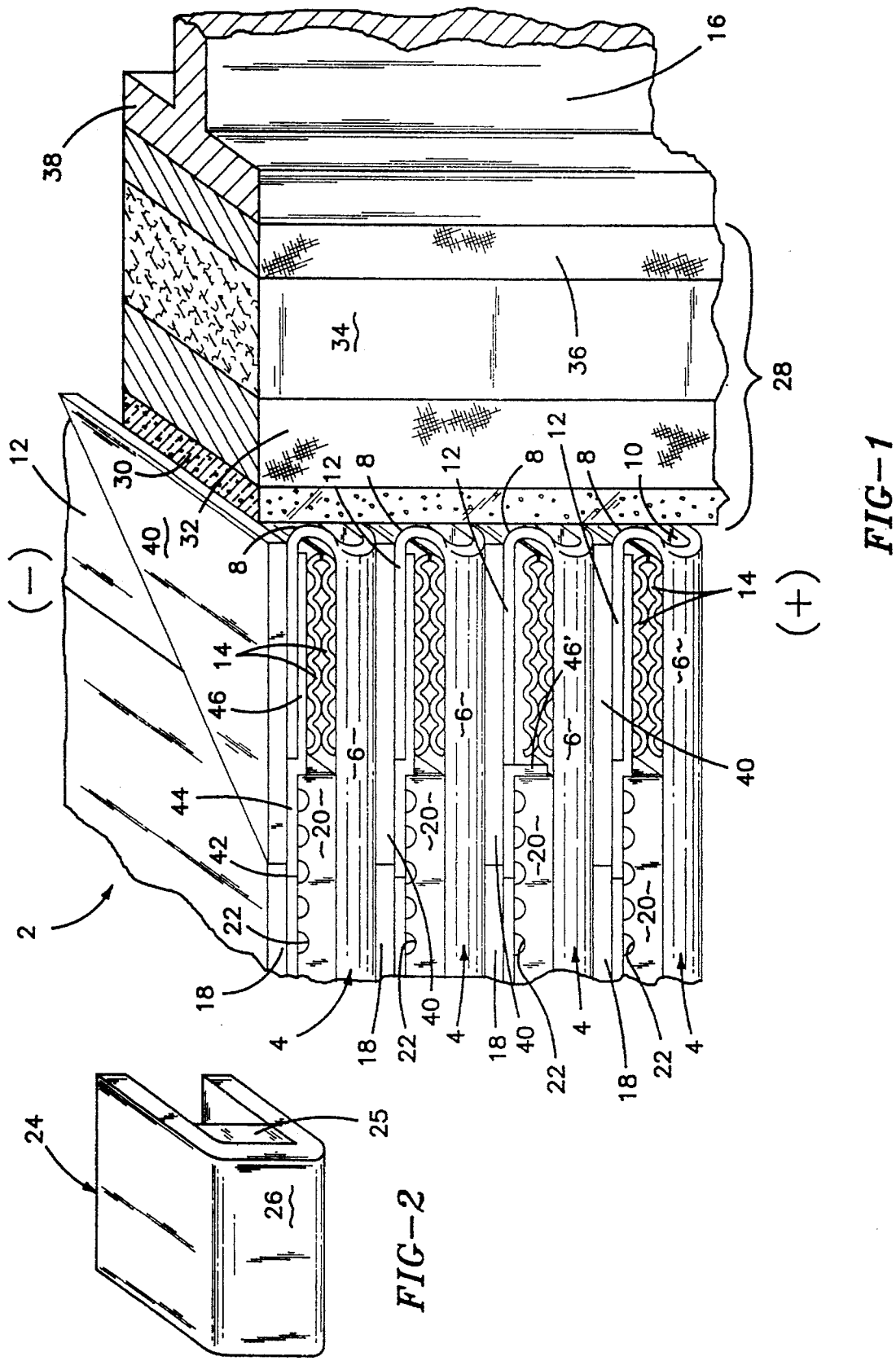

EDGE SEALS FOR MOLTEN CARBONATE FUEL CELL STACKS

TECHNICAL FIELD

This invention relates to seals for molten carbonate fuel cell stacks, and more particularly, to electrolyte migration-inhibiting reactant manifold and stack corner seal assemblies which significantly limit electrolyte migration during fuel cell stack operation.

BACKGROUND ART

Electrolyte migration during fuel cell stack operation is a persistent problem, and can result in cells drying out at the lower (positive) end of the stacks, and cells flooding at the upper (negative) end of the stack. U.S. Pat. No. 4,761,348 granted Aug. 2, 1988 to H. R. Kunz, et al. addresses the problem. This patent offers a solution which entails providing inactive electrolyte reservoirs at each end of the stack, with the negative end reservoir being initially low in electrolyte; and the positive end reservoir being initial high in electrolyte fill. This patent also describes the use of high porosity, low electrolyte retention seals which will limit electrolyte migration during stack operation. The patent suggests the use of lithium aluminate fibers to form a highly porous fibrous ceramic strip which will be capable of containing no more than 4% by volume of the molten electrolyte. The fibers are said to be smooth and have a diameter of about 0.5 to 20 microns. The problem with using lithium aluminate fibers to form a sealing mat is that the fibers are so short as to be unable to form a seal mat that is stable over time during stack operation and the mat does not possess the necessary shear strength for vertical seals in the fuel cell stack. These short fibers cannot be effectively cast or felted into a stable seal mat. The use of lithium aluminate fibers is thus not a satisfactory solution to the problem of electrolyte migration in a molten carbonate fuel cell stack.

U.S. Pat. No. 4,548,874 granted Oct. 22, 1985 to M. Katz, et al. suggests the use of lithium aluminate for use in a porous sealing gasket. This patent suggests that the sealing gasket could be formed from a lithium aluminate mat. The same problems and drawbacks found in forming a sealing gasket mat of lithium aluminate fibers which are inherent in the Kunz, et al. reference, are also present in the Katz, et al. teachings. Thus the Katz, et al. reference does not offer a viable solution for lithium carbonate electrolyte migration during extended stack operation.

Another attempt to control electrolyte migration in a molten carbonate fuel cell stack is found in U.S. Pat. No. 4,659,635, granted Apr. 23, 1987 to C. A. Reiser, et al. This patent describes a solution which involves forming marginal portions of the electrolyte matrices with larger pore sizes than the central portions of the matrices. This solution attempts to prevent the electrolyte from migrating to the outer edges of the matrices so that it cannot reach the seals. The difficulty with this solution relates to the forming of a matrix plate with one portion having a low porosity so that it can retain the electrolyte because of high capillary forces, and another portion with a high porosity so that it cannot retain electrolyte because of low capillary forces.

DISCLOSURE OF THE INVENTION

This invention relates to a .molten carbonate fuel cell stack which includes seals in the stack formed from lithium aluminate, a material which is very stable at stack operating temperatures, and under stack operating conditions. The seals are formed from large grains of lithium aluminate which are bonded together to form seals that have sufficiently large pores so as to be incapable of absorbing significant amounts of electrolyte from the stack electrode matrices.

The seal members contemplated by this invention are used to seal the stack manifolds from ambient surroundings, and are used to seal the corners of the stack so that electrolyte will not significantly move from the matrices toward the reactant manifolds. The manifold seals are oriented vertically on the stack and are therefore formed from a lithium aluminate composite that possesses the requisite degree of shear strength. The preferred seal composite for these vertical seals is formed from lithium aluminate grains, which are generally spheroidal, and have a diameter in the range of about 45 microns to about 75 microns. The binder for these vertical seals is preferably a boron glass which is silicafree. A lithium aluminate grain mixture of the preferred size range is blended with a binder system of Butvar (a poly butyraldehyde), a plasticizer (Santicizer 8) and alcohol. A small amount of boric acid is added to the blend so as to homogeneously coat the lithium aluminate grains with a boron oxide glass layer. The boron oxide layer is thin, so as to minimize the percent of glass in the composite. Boric acid will convert to boron oxide at about 250° C. which is within the range of stack operating temperatures. The boron oxide will then react with the lithium aluminate grains to form a thin glassy phase on the surface of the lithium aluminate grains. The lithium aluminate grains, the alcohol and boric acid components are mixed together to form a paste or caulk which is spread onto the side of the stack and cast onto a layer which is placed against the remainder of the manifold seal assembly, which is then pressed against the sides of the stack. When the stack is heated to operating temperatures, the caulk is chemically converted to a lithium aluminate glass bonded seal layer which forms an electrolyte migration barrier at the edges of the stack.

This invention also contemplates the use of seals which are arranged in horizontal planes in the stack. The seals are located at the corners of the stack, and are also formed from large size lithium aluminate grains. The horizontal seal members are preferably formed from lithium aluminate grains which are bonded together by surface hydrolysis. Lithium aluminate is a moisture-absorbing compound, which will absorb water on its surface when placed in a humid environment. The moisture absorbed onto the surface of the lithium aluminate grains makes the grains tacky, or sticky. These tacky grains are formed into seal tabs which are laid on corners of the fuel cell stack, which seal tabs contact the electrolyte matrices, and extend outwardly therefrom toward the vertical manifold seals. The invention also contemplates the inclusion of components which will even further limit electrolyte migration in a molten carbonate fuel cell stack.

It is therefore an object of this invention to provide sealing members for use in molten carbonate fuel cell stacks which sealing members will not transfer significant amounts of electrolyte during operation of the stack.

It is a further object of this invention to provide sealing members of the character described which are formed from large grains of lithium aluminate bonded together to form a cohesive seal member.

It is an additional object of this invention to provide sealing members of the character described which possess sufficient shear strength so as to be usable in sealing vertical edges of the reactant manifolds of the fuel cell stack.

It is another object of this invention to provide sealing members of the character described which will effectively seal the corners of the stack separator plates against electrolyte migration from the cell matrices to the vertical manifold seals.

These and other objects and advantages of the invention will become more readily apparent from the following detailed disclosure of a preferred embodiment of the invention when taken in conjunction with the accompanying drawings, in which:

BRIEF DESCRIPTION OF THE DRAWINGS

FIG. 1 is a fragmented perspective view partially in section of a preferred embodiment of the invention installed in a molten carbonate fuel cell stack; and FIG. 2 is a perspective view of an edge sealing member for closing off side portions of the separator plates adjacent to the corners of the stack.

BEST MODE FOR CARRYING OUT THE INVENTION

Referring now to the drawings, there is shown a portion of a molten carbonate fuel cell stack denoted generally by the numeral 2. The stack 2 preferably includes an inactive electrolyte reservoir at the upper end of the stack 2, as described in aforesaid U.S. Pat. No. 4,761,348. The stack 2 includes a plurality of separator plates 4 which are formed from stainless steel with inwardly turned aluminized edges 6 and 8. The separator plates 4 are formed substantially in accordance with the teachings in U.S. Pat. No. 4,514,475 granted Apr. 30, 1985 to A. P. Mientek. The edges 6 and 8 terminate in inwardly extending horizontal aluminized tabs 10 and 12 respectively, which form supporting surfaces whereupon the plates 4 can be stacked upon each other. Load bearing springs 14 are sandwiched inside of the separator plate edges 6 and 8 beneath the tabs 10 and 12. The plates 4 thus allow the formation of reactant flow fields which alternate in direction, and extend between opposite sides of the stack 2 where the reactant inlet and outlet manifolds are mounted as generally described in aforesaid U.S. Pat. No. 4,514,475. A portion of one of the manifolds is indicated by the numeral 16. The two-layer electrolyte matrices are indicated by the numeral 18, and reactant flow field plates 20 having reactant passages 22 formed therein are disposed on either side of the matrices 18. The cathode flow field plates 20 are formed from an electrically conductive material such as nickel oxide. At the corner portions of the stack 2, the ends of the tabbed edges 10 and 12 are closed by generally U-shaped members 24 which frictionally clip under the tabs 10 and 12 and which provide generally planar outer surfaces 26 which the manifold sealing assembly contacts. The members 24 are formed from aluminized stainless steel. A layer of lithium aluminate caulk 25 is disposed on the inner surface of the members 24 to retard electrolyte migration.

The manifolds 16 are mounted on the sides of the stack 2 via vertical sealing and insulating assemblies 28. The sealing assembly 28 includes an innermost layer 30 formed from the large lithium aluminate grains which are bonded together by a boron glass binder. The method of producing the vertical lithium aluminate layer 30 will be described in greater detail hereinafter. The lithium aluminate seal layer 30 contacts the planar surfaces 26 of the clip members 24. Outwardly of the lithium aluminate layer 30 is a fine pore zirconia cloth gasket 32 which will serve to wick any electrolyte that manages to reach the seal layer 30 away from the latter. Electrolyte wicked into the cloth gasket 32 will be pumped up through the gasket 32 to the negative inactive electrolyte reservoir. The cloth gasket 32 thus keeps the seal layer 30 dry. An electrically insulating alumina ceramic rail 34 is disposed outwardly of the cloth gasket 32 and serves to electrically insulate the manifold 16 from the internal stack components. A second zirconia cloth gasket 36 is sandwiched between the alumina rail 34 and a basal flange 38 on the manifold 16. The manifold 16 will be clamped tightly against the seal and insulating assembly 28.

The corners of the stack 2 between each separator plate 4 are sealed as follows. Flat sealing gaskets 40 formed from the large lithium aluminate grains are bonded together by means of surface hydrolysis which occurs with lithium aluminate grains, which are hygroscopic and possess sticky or tacky surfaces. The surface hydrolysis bond does not possess significant shear strength, but is sufficiently strong and flexible to perform its sealing function. The sealing gaskets 40 extend from the edge of the matrix layers 18 to the vertical seal layer 30. The large pore sizes in the seal gasket 40 serve to retard migration of electrolyte from the matrix 18 to the outer corners of the stack 2. The horizontal corner seal assembly also includes an aluminized stainless steel labyrinth seal strip 42 on the cathode side, or a nickel metal strip (not shown) on the anode side, both of which have a first portion 44 that separates the seal gasket 40 from the cathode 20 (or anode, in the case of the anode side); and a second portion 46 which extends outwardly thereby increasing the creepage distance from the cathode 20 to the vertical seal 30. The second portion 46 of the labyrinth seal strip 42 may extend beneath the tabs 12, or may extend downwardly away from the tabs 12, as denoted by the numeral 46'. The seal strips 42 provide an additional impervious barrier between both the cathode 20 and the outer edges of the stack 2. Analogous structures (not shown) are present on the anode side of the stack.

The lithium aluminate grains used in forming the seals 30 and 40 are refined in the following manner. The range of particle sizes preferred for use in this invention is from about 45 to about 75 microns. A commercially available source of lithium aluminate particles, which can be obtained from Foote Mineral Co., 155 Bacton Hill Road, Frazer, Pa. 19355 is processed to remove undesirably small grains, or "fines" in the following manner. The lithium aluminate powder is pre-dried in a vacuum for about two hours at a temperature of about 120° C. and then heated for about sixteen hours at about 200° C. in air. These heating steps are effective to remove any water from the grains, which as noted above, are strongly hygroscopic and tend to absorb ambient water. This pretreated powder is then sieved on screens which are preheated to about 110° C. The screen is selected to pass grains which are less than about 40 microns in diameter. The powder remaining will thus have had the fines removed therefrom; and a second screening is then conducted to produce a mixture of particulate grains which are in the range of about 40 microns to about 75 microns in diameter. This diameter range has been determined to be especially effective in inhibiting electrolyte migration while producing effective seals from ambient surroundings.

Once the desired lithium aluminate grain size range has been isolated, the two different seal members are formed as follows.

The vertical seal member 30 is formed as follows. The lithium aluminate grains are mixed with a binder system of Butvar-Santicizer 8-alcohol in the amount of 3.2% Butvar—1% santicizer by weight. A small amount of boric acid (0.1 to 2.0% by weight) is added to the mixture. The mixture is blended to form a paste or caulk-like consistency product. The paste is tape cast into a layer 60 mils thick. The caulk-like material is applied to the side of the stack 2, and then the manifold 16 and seal/insulation assembly 28 are attached to the stack 2. When the stack 2 is brought up to operating temperatures, the boric acid, which is soluble in the binder system, will convert to boron oxide at about 250° C. which will melt at about 470° C., which is below the electrolyte melting temperature, and will then react with the lithium aluminate to form a glassy phase on the surface of the lithium aluminate grains. The resultant glassy phase is silica-free, and is therefore less corrosive at stack operating temperatures then silica glass binders. The resultant glassy binder is a surface phenomenon, and is therefore present in minimal amounts so that the seal layer 30 retains its electrolyte migration-inhibiting porosity. The lithium aluminate particle/glassy binder composite seal layer can thus be formed in situ on the stack when the stack is first put into operation. The seal layer 30 is preferably about 60 mils thick when cast onto the stack in the paste or caulk form. The resultant lithium aluminate particle/glassy binder composite possesses sufficient shear strength to form a durable seal that is required for vertical seals in the stack.

The horizontal seals 40, which do not require significant shear strength, are formed as follows. The twice screened 45–75 micron lithium aluminate grains are mixed with the above described binder system 5.5% Butvar with no boric acid. The slurry is tape cast to matrix thickness. Triangular pieces are cut from the tape and laid upon the corners of the separator plates 4, in the manner shown in FIG. 1. Then the stack 2 is started up, wet ambient conditions which are encountered promote surface hydrolysis bond formation between touching lithium aluminate particles, which will form a cohesive seal. At stack operating temperatures, the hydrolysis reverses to some extent so as to afford a degree of flexibility to the seals without losing seal coherency. Thus, both of the lithium aluminate seals 30 and 40 can be formed in situ during stack startup.

It will be readily appreciated that the lithium aluminate seals of this invention will provide for durable extended life protection against electrolyte migration in a molten carbonate fuel cell stack. The large pore size in the seals is not conducive to capillary movement of electrolyte within the seals. The use of a glass binder for the vertical manifold seal assembly provides the necessary mechanical strength, and the placement of the zirconia cloth layer adjacent to the lithium aluminate manifold seal member ensures that the latter will remain dry even though some electrolyte may reach it. The horizontal corner seal assemblies which include the surface hydrolysis bonded lithium aluminate grains and the adjacent labyrinth seals are very effective in retarding migration of electrolyte from the electrolyte matrices and electrodes to the edges of the stack.

Since many changes and variations of the disclosed embodiments of the invention may be made without departing from the inventive concept, it is not intended to limit the invention otherwise than as required by the appended claims.

What is claimed is:

1. A seal member for use in a molten carbonate fuel cell stack, said seal member comprising large spheroidal grains of lithium aluminate and means for binding said grains together to impart to said member an internal capillarity which will not support significant electrolyte migration through said member.

2. The seal member of claim 1 wherein said lithium aluminate grains have a diameter in the range of about 45 microns to about 75 microns.

3. The seal member of claim 2 wherein said means for binding is a surface hydrolysis layer formed on said lithium aluminate grains.

4. The seal member of claim 2 wherein said means for bonding is a boron glass layer formed on the surface of said lithium aluminate grains.

5. A seal member for sealing horizontal surfaces in a molten carbonate fuel cell stack against electrolyte migration from an electrolyte matrix to an outer edge of the stack, said seal member comprising a mixture of lithium aluminate grains which are spheroidal in shape, and which have a diameter in the range of about 45 microns to about 75 microns, said grains being bonded together by a surface hydrolysis layer formed on said lithium aluminate grains.

6. A seal member for sealing a vertical surface of a molten carbonate fuel cell stack against electrolyte migration through said seal member, said seal member comprising a mixture of lithium aluminate grains which are spheroidal in shape and which have a diameter in the range of about 45 microns to about 75 microns, said grains being bonded together by a glass layer formed on the surface of said lithium aluminate grains.

7. The seal member of claim 6 wherein said glass layer is a silica-free boron glass.

8. A horizontal seal assembly in a molten carbonate fuel cell stack for limiting electrolyte migration from an electrolyte matrix layer and electrode to an outer edge of the stack, said seal assembly comprising:

a) a tab comprising spheroidal grains of lithium aluminate, which grains have a diameter in the range of about 45 microns to about 75 microns, said tab being disposed adjacent to said electrolyte matrix and extending to said outer edge of said stack; and b) a metal labyrinth seal strip having a first portion underlying a part of said tab and extending to an edge of said electrolyte matrix.

9. The seal assembly of claim 8 wherein said labyrinth seal strip includes a second portion which extends from said first portion and is angularly offset from said tab.

10. The seal assembly of claim 9 wherein said second portion of said labyrinth seal strip extends away from said electrolyte matrix and underlies a separator plate in the stack.

11. A vertical reactant manifold seal assembly in a molten carbonate fuel cell stack for limiting electrolyte migration vertically through the stack, said seal assembly comprising:

a) a layer of spheroidal lithium aluminate grains having a diameter in the range of about 45 microns to about 75 microns, said grains being bonded together by a glass layer formed on the surface of said lithium aluminate grains, said lithium aluminate-glass layer extending vertically along an outer edge of the stack;

b) a layer of fine pore zirconia cloth extending vertically of the stack, said zirconia cloth layer contacting said lithium aluminate-glass layer and being operable to remove from the latter any electrolyte which may migrate thereto from the stack interior so as to keep said lithium aluminate-glass layer essentially dry;

c) an electrically insulating ceramic layer disposed on said zirconia cloth layer; and d) a reactant manifold mounted on said stack, said three layers being interposed between said manifold and active areas of the stack.

12. The seal assembly of claim 11 further comprising a plurality of aluminized steel clips mounted on adjacent cell separator plates in the stack, said clips forming a contact surface for said lithium aluminate-glass layer.

13. The seal assembly of claim 12 wherein said clips are generally C-shaped and contain an electrolyte migration-inhibiting caulk.

14. A method for forming a lithium aluminate seal member in a molten carbonate fuel cell stack, said method comprising the steps of:

a) pretreating a supply of lithium aluminate particles by drying said particles so as to remove absorbed water from said particles;

b) screening said pretreated lithium aluminate particles on a preheated screen to remove particles below about 40 microns in size;

c) screening said pretreated lithium aluminate particles on a preheated screen to remove particles above about 75 microns in size; and d) bonding said screened and dried particles into a self-sustaining porous seal member.

15. The method of claim 14 wherein said bonding step is performed by forming surface hydrolysis bonds on said particles during fuel cell stack startup.

16. The method of claim 14 wherein said bonding step is performed by forming a silica-free glassy bonding phase on the surface of said particles.

17. The method of claim 16 wherein said glassy bonding phase is formed during fuel cell stack startup.

18. A method for forming a lithium aluminate seal member in a molten carbonate fuel cell stack, said method comprising the steps of:

a) pretreating a supply of lithium aluminate particles by drying said particles so as to remove absorbed water from said particles;

b) screening said pretreated lithium aluminate particles on a preheated screen to remove particles below about 40 microns in size;

c) screening said pretreated lithium aluminate particles on a preheated screen to remove particles above about 75 microns in size; and d) mixing said screened and dried particles with an alcohol santicizer and boric acid mixture to form a pasty caulk;

e) heating said caulk to convert the boric acid to boron and reacting the boron with the lithium aluminate particles to form a glassy bonding phase on the surface of said particles thereby forming a porous self-sustaining seal member having an internal capillarity which will not support significant electrolyte migration.

19. The method of claim 18 wherein said heating step is performed on the fuel cell stack during startup of the latter so that the seal member is formed in situ on the stack.

* * * * *

UNITED STATES PATENT AND TRADEMARK OFFICE
CERTIFICATE OF CORRECTION

PATENT NO. : 5,478,663
DATED : December 26, 1995
INVENTOR(S) : Ned E. Cipollini, et al.

It is certified that error appears in the above-identified patent and that said Letters Patent is hereby corrected as shown below:

In column 1, before the phrase "TECHNICAL FIELD", insert --This invention was made with government support under Contract DE-AC21-87MC23270 awarded by the Department of Energy. The government has certain rights in the invention.--

Signed and Sealed this

Sixth Day of August, 1996

Attest:

BRUCE LEHMAN

Attesting Officer

Commissioner of Patents and Trademarks